Jan. 22, 1957 S. M. MOBERG 2,778,666
LOCKING SEAL
Filed May 26, 1955 2 Sheets-Sheet 1
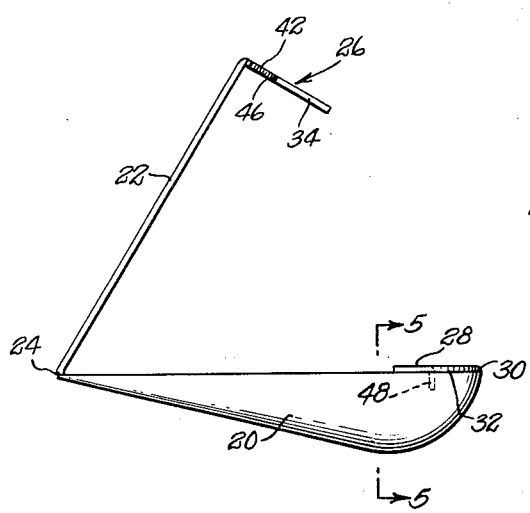
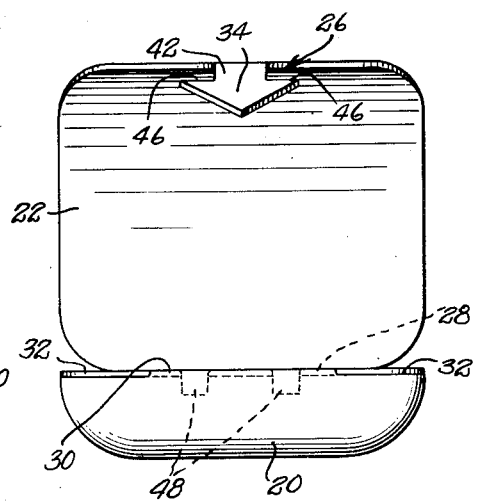
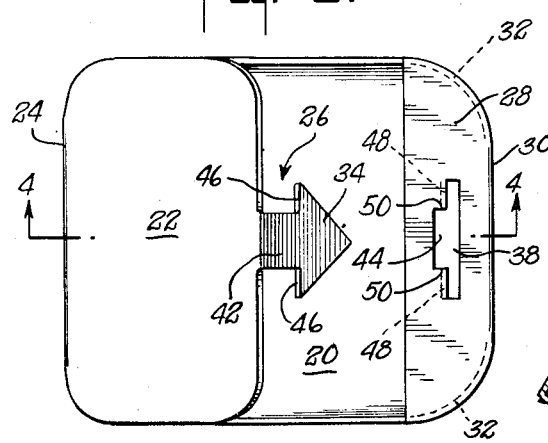
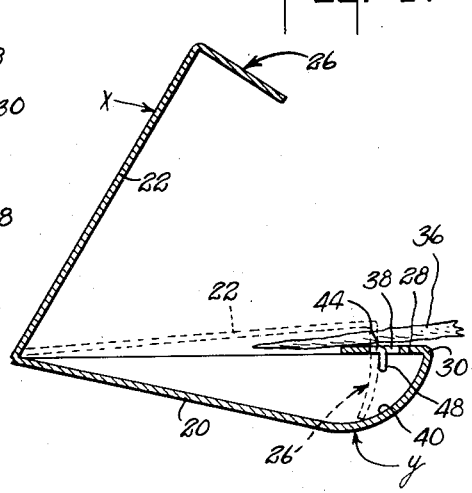
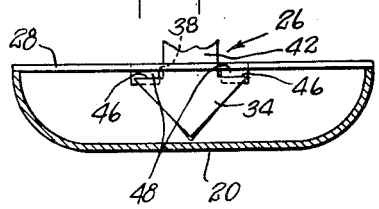
INVENTOR.
SIGURD M. MOBERG
BY Robert Henderson
ATTORNEY Jan. 22, 1957  S. M. MOBERG  2,778,666
LOCKING SEAL
Filed May 26, 1955  2 Sheets-Sheet 2
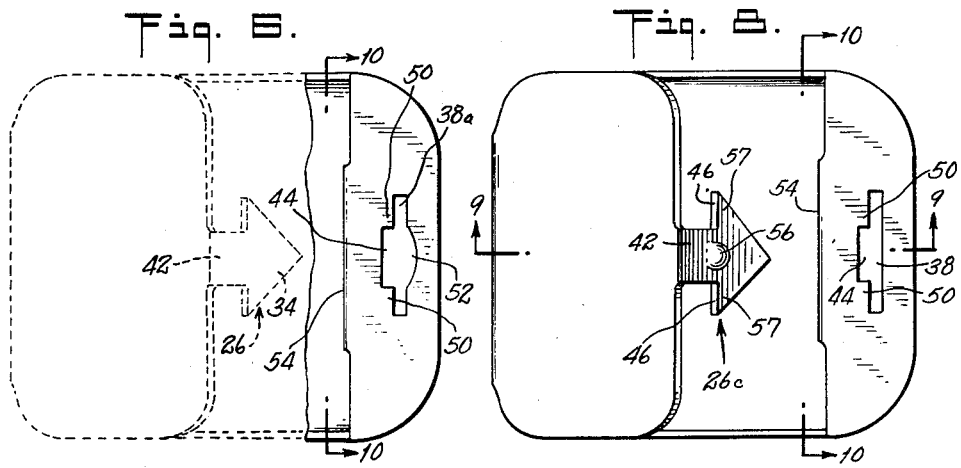
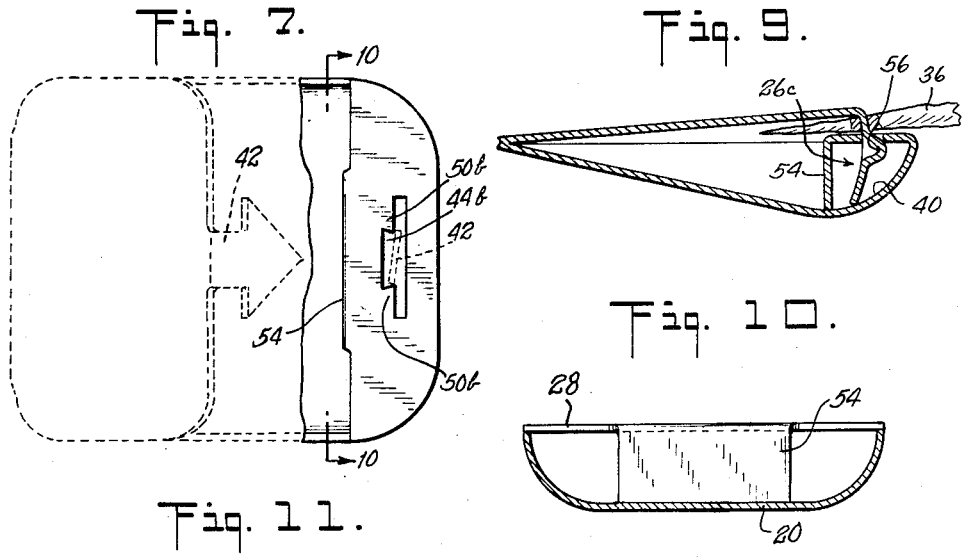
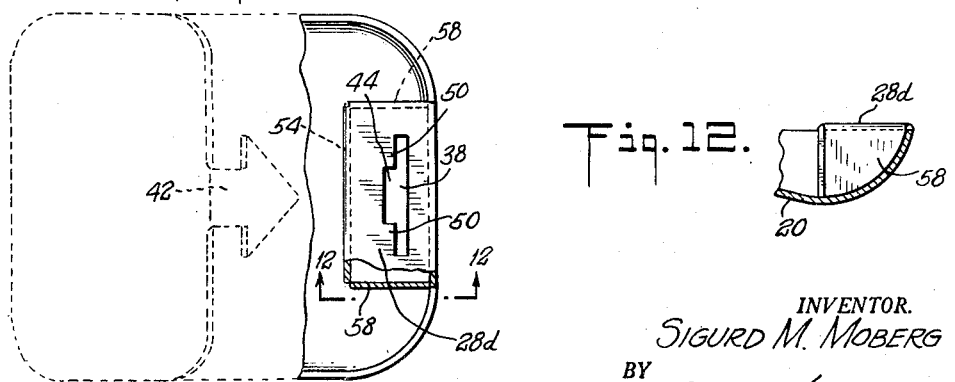
INVENTOR.
SIGURD M. MOBERG
BY Robert Henderson
ATTORNEY

# United States Patent Office 2,778,666
Patented Jan. 22, 1957

2,778,666

LOCKING SEAL

Sigurd M. Moberg, Pompton Plains, N. J., assignor to E. J. Brooks Company, Newark, N. J., a corporation of New Jersey Application May 26, 1955, Serial No. 511,255

7 Claims. (Cl. 292—325)

This invention relates to seals commonly made of sheet metal and designed for application to a product for various purposes as, when applied to poultry for example, to show the grading of the poultry or the conditions under which it was killed or to indicate the packer of the poultry. Such seals may likewise be applied to the tails of certain types of fish for somewhat similar purposes; and, if slightly modified, may be attached to package or tag cords in the manner illustrated, for example, in Figs. 4, 5 and 6 of patent to Winfred M. Brooks, No. 2,487,419, dated November 8, 1949.

The principal object of the invention is the provision of such a seal having improved means by which it may be so locked upon poultry or other products or upon a package or tag cord in such manner as to render it practically impossible to remove the seal except by cutting it from the product or cord to which it is applied. Such removal, incidentally, is not desired to occur until the product or package has reached the ultimate consumer at which time the seal will have completely fulfilled its purpose.

The stated object and other more or less obvious objects are accomplished by the present invention of which several embodiments, suitable for application to a wing of a fowl, are shown for illustrative purposes in the drawings without, however, limiting the invention to the particular embodiments shown or to the use of the invention only on poultry.

In the drawings:

Figure 1 is a side elevational view of a seal according to a first embodiment of this invention, the seal being open as before application to a wing of a fowl.

Fig. 2 is an end elevational view of said open seal.

Fig. 3 is a top plan view of said open seal.

Fig. 4 is a sectional view substantially on the line 4—4 of Fig. 3.

Fig. 5 is a sectional view substantially on the line 5—5 of Fig. 1; there being additionally shown, however, a piercing and locking tongue as positioned when the seal is locked closed.

Figs. 6, 7 and 8 are views somewhat similar to Fig. 3, showing respectively second, third and fourth embodiments of this invention all differing from the first embodiment and from each other with respect to the seals' locking means.

Fig. 9 is a sectional view substantially on the line 9—9 of Fig. 8.

Fig. 10 is a sectional view substantially on the line 10—10 of Figs. 6, 7 and 8.

Fig. 11 is a view somewhat similar to Figs. 3, 6, 7 and 8, but showing a fifth embodiment of the invention.

Fig. 12 is a fragmentary, sectional view substantially on the line 12—12 of Fig. 11.

The first illustrated embodiment, particularly suitable for application to the wing of a fowl, although usable on other products, is formed of a single piece of suitable sheet metal stamped, pressed and folded to the shape shown in Figs. 1-5, which is the approximate shape in which it is manufactured for delivery to a poultry processor who will apply it to his product.

The seal consists of four principal parts; a dished front member 20, a preferably flat back member 22 connected to said front member for hinge-like bending relatively to the latter at hinge connection 24, a locking tongue 26 which is integral with back member 22 at the side of the latter which is opposite to the hinge connection 24 and is disposed in approximately right-angular relationship to said back member, and a locking plate 28 through which the tongue 26 extends to lock the back member securely into close association with the front member, said locking plate being integral with said front member and so proportioned and bent along a margin 30 as to intimately overlie and derive support from curved edges 32 of the front member 20 at opposite sides of the device.

The seal is applied to the wing of a fowl by being grasped between one's thumb and first one or two fingers, usually with the thumb at point X and the first one or two fingers at point Y in Fig. 4, the members 20 and 22 then being pressed from their open positions as shown in full lines in said figure to their closed positions in which member 22 is in its dotted-line position in relation to member 20.

During the mentioned closing of the seal, an arrowhead shaped prong 34 of the locking tongue pierces and passes through the fowl's wing, of which a fragment is shown at 36; thence the prong passes through an aperture 38 in the locking plate until the tip of the prong engages a curved, inner, camming surface 40 of the front member which, with continued pressure of the thumb, causes the tongue 26 to bend inwardly or leftwardly, as viewed in Fig. 4. As a result, a neck portion 42 of said tongue moves inwardly into a side bay or enlargement 44 of the aperture 38 and shoulders 46, defining the inner extremity of prong 34, pass beneath and to similar positions in back of lips 48 formed of sheet metal which, instead of being completely cut away to form the opposite end areas of the aperture 38, has been only partially cut and bent down to form said lips.

Several important relationships and conditions should be noticed. Thus, the width of neck 42 is slightly less than the length of bay 44, and the overall length and width of the main portion of aperture 38 are at least slightly greater, respectively, than the width and thickness of prong 34. The length of said prong, i. e., the distance from its tip to shoulders 46, is such that when the tongue 26 is bent only slightly, as indicated, in the closing of the device, said shoulders will pass beneath and to positions in back of lips 48 in which said shoulders will be locked in place underneath ledges 50 at opposite ends of the bay 44.

It should be noted that the sheet metal of which these devices are commonly made is bendable and slightly resilient. That characteristic has some bearing upon the effectiveness of the locking means in the device. Thus, in actual usage, the back member 22 would usually be pressed downwardly slightly more than shown in Fig. 4 and tongue 26 would be bent inwardly slightly more than there shown. Therefore, it may be understood that when finger pressure is released, after the device has been closed, the slight resiliency of the tongue and, perhaps, the presence of wing portion 36 will cause the prong 34 to rise into place in back of lips 48. The metal's resiliency, however, is not sufficient to permit the tongue to spring back outwardly enough to clear said lips and clear the ledges 50. For these reasons, the prong 34 is locked beneath plate 28 to render opening of the device practically impossible.

It may seem that one could open the seal by inserting a knife or the like, at one side of the seal, between front and back members 20, 22 and then pushing the prong 34 outwardly with the end of the knife. However, such outward pushing of the prong could not be accomplished unless the prong were first pushed downwardly so that it could pass outwardly beneath the lips 48, but the very fact that the knife would be in place as just suggested would make it impossible or at least extremely difficult for the prong to be thus pushed down. Hence, the seal just described is incapable, as a practical matter, of being unlocked and opened.

It may be understood that the outer surfaces of the front and back members 20, 22 of the seal just described, and of others hereinafter described, may be utilized for application thereto of lithographing or printing of a name, a trademark, a grade mark, a number, or a date, etc., or any one or several thereof as the user of the seal may desire.

The second embodiment of Fig. 6 differs from the first embodiment in three respects, (1) in the omission of lips 48, (2) in the enlargement of aperture 38a as at 52, and (3) by the provision of an apron 54 bending downwardly from plate 28. When the lips 48 are omitted, the tongue 26 is held in the bay 44 and the prong 34 is held beneath ledges 50 by reason of having been bent into said bay and underneath said ledges by cam surface 40 in the manner already described with reference to the first embodiment; the resiliency of the metal tongue being insufficient to cause the tongue to spring out of said bay and the cam surface 40 also coacting with the prong to prevent such outspringing of said tongue. The enlargement 52 is provided merely to afford a larger opening for initial entry or guidance of prong 34 thereinto and into locking position. The apron 54 is in such position as to frustrate any attempts to use a knife or the like to push the tongue 26 outwardly to open the seal. Said apron, additionally, gives support to plate 28.

The third embodiment of Fig. 7 differs from the second embodiment only in the shapes of the ledges 50b and of bay 44b and the relative dimensions of the mouth of the bay and the width of neck 42. In this arrangement, the mouth of the bay may be so small that the neck portion 42 of the tongue would have to cant slightly, as indicated in broken lines, in order to enter the bay. This canting would occur quite readily when the device is being closed but the restricted mouth of the bay would strongly oppose emergence of the tongue therefrom.

The fourth embodiment of Figs. 8 and 9 includes a bead 56 formed in tongue 26c approximately in line with shoulders 46, the dimensions of said bead and related parts being such that wings 57 of prong 34 may flex slightly to enable the bead to be forced through aperture 38. The bead, thereafter, opposes release of tongue 26c from said aperture and holds the neck 42 in the bay 44.

The fifth embodiment of Fig. 11 has a plate 28d which is smaller than plate 28 and not only has a bent-down apron 54 but similar, opposite, side aprons 58, all opposing use of a knife or the like to open the seal and also affording support for the plate 28d.

Fig. 10 shows that an apron such as is shown at 54 may be employed, for its stated purposes, in various embodiments as, for example, those shown in Figs. 6, 7, and 8 and 9. A similar apron is also shown in the embodiment of Fig. 11. It should be observed, also, that, although the aperture enlargement 52 is illustrated only in Fig. 6, such an enlargement, for like purposes, may be employed in the other illustrated embodiments excepting the one illustrated in Figs. 8 and 9.

It should be evident that the present inventive concept makes possible the provision of very simple and inexpensive, yet very effective, locking means in a seal and that said concept may be employed in various ways other than those illustrated and described herein without, however, departing from the invention as set forth in the following claims.

I claim:

1. A seal of bendable sheet metal comprising a dished front member and a back member hingedly connected to said front member, the two said members having interlocking means adjacent margins thereof opposite from the points of such hinged interconnection, said interlocking means comprising an integral locking tongue, on and substantially perpendicular to the general plane of said back member, having a prong at its free end and a neck, narrower than said prong, between the latter and said back member, and a flat locking plate integral with said front member and overlying a dished portion of the latter in substantially coplanar relationship to said hinged interconnection, the said plate being formed with an elongate aperture therein to admit said prong therethrough, and having ledges defining opposite ends of a bay enlargement of said aperture of less length than said aperture and located at one end of the latter intermediate the ends thereof, and said dished portion having an inner cam surface below and spaced from said plate and adapted to coact with said prong, when the latter is pushed through said aperture, to bend said tongue to move the latter's said neck into said bay enlargement and opposite sides of said prong into perpendicular locking position underneath said ledges; the spacing of said cam surface from said plate being only slightly less than the combined lengths of said prong and of that part of said neck which passes through said aperture in closing the seal, whereby said bending of the tongue leaves the latter substantially perpendicular to said plate.

2. A seal according to claim 1, said locking tongue having insufficient resiliency to cause its neck to move out of said bay enlargement after having once been bent thereinto.

3. A seal according to claim 1, said cam surface coacting with said prong to hold the neck of the locking tongue within said bay enlargement and to hold the prong in its said locking position.

4. A seal according to claim 1, further including depending lips integral with said locking plate at opposite ends of said bay enlargement and of such size and disposition as to extend in front of and in substantial overlapping relationship with a portion of said prong, after such bending of the locking tongue, to lock the latter against emergence of its neck from said bay enlargement.

5. A seal according to claim 4, said aperture including an elongate slot extending transversely of the seal, said bay enlargement centrally adjoining said slot at the side thereof toward which said tongue is thus bent, and said lips extending downwardly from sides of said ledges which also define parts of one side of said slot beyond the ends of said bay enlargement, said lips being formed of metal partially punched downwardly in the formation of the slot.

6. A seal according to claim 1, said tongue having an outwardly protruding bead approximately coincident with the inner end of said prong and adapted to coact with an edge partially defining said aperture to hold the neck of the tongue in said bay enlargement when the seal is closed.

7. A seal according to claim 1, the ends of said bay enlargement tapering toward each other in the direction of the adjacent margin of the seal's front member, and said ledges each having side edges which adjoin at acute angles, and the neck of the tongue being adapted to enter said bay enlargement in a canted position.

References Cited in the file of this patent
UNITED STATES PATENTS

| 1,932,101 | Dietz | Oct. 24, 1933 |
| 2,084,668 | Brooks | June 22, 1937 |
| 2,487,419 | Brooks | Nov. 8, 1949 |
| 2,610,878 | Brooks | Sept. 16, 1952 |
| 2,626,825 | Stoffel | Jan. 27, 1953 |
| 2,662,789 | Stoffel | Dec. 15, 1953 |